US012587433B2

(12) United States Patent
Ramanujan et al.

(10) Patent No.:    US 12,587,433 B2

(45) Date of Patent:    Mar. 24, 2026

(54) NODE HEALTH PREDICTION BASED ON FAILURE ISSUES EXPERIENCED PRIOR TO DEPLOYMENT IN A CLOUD COMPUTING SYSTEM

(71) Applicant: Microsoft Technology Licensing, LLC, Redmond, WA (US)

(72) Inventors: Sanjay Ramanujan, Issaquah, WA (US); Luke Rafael Rodriguez, Seattle, WA (US); Muhammad Khizar Qazi, Seattle, WA (US); Aleksandr Mikhailovich Gershaft, Redmond, WA (US); Marwan Elias Jubran, Kirkland, WA (US); Saurabh Agarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 18/101,999

(22) Filed: Jan. 26, 2023

(65) Prior Publication Data

US 2023/0239194 A1    Jul. 27, 2023

Related U.S. Application Data

(62) Division of application No. 16/718,178, filed on Dec. 17, 2019, now Pat. No. 11,582,087.

(51) Int. Cl.
*H04L 41/0631*        (2022.01)
*H04L 41/0654*        (2022.01)
(Continued)

(52) U.S. Cl.
CPC ........ *H04L 41/0645* (2013.01); *H04L 41/064* (2013.01); *H04L 41/0654* (2013.01); *H04L 41/0686* (2013.01); *H04L 67/10* (2013.01)

(58) Field of Classification Search
CPC .............. H04L 41/0645; H04L 41/064; H04L 41/0654; H04L 41/0686; H04L 67/10;
(Continued)

(56) References Cited

U.S. PATENT DOCUMENTS

2015/0281011 A1 * 10/2015 Gates .................... H04L 41/065
709/224

FOREIGN PATENT DOCUMENTS

JP          2019101830 A  *  6/2019
WO      WO-2007013468 A1 *  2/2007   ........... F01K 13/006

OTHER PUBLICATIONS

Communication under Rule 71(3) EPC, Received for European Application No. 20821078.1, mailed on Jul. 8, 2025, 8 pages.

* cited by examiner

*Primary Examiner* — Cheikh T Ndiaye

(74) *Attorney, Agent, or Firm* — Ray Quinney & Nebeker P.C.; Tiffany B. Healy

(57)                ABSTRACT

To improve the reliability of nodes that are utilized by a cloud computing provider, information about the entire lifecycle of nodes can be collected and used to predict when nodes are likely to experience failures based at least in part on early lifecycle errors. In one aspect, a plurality of failure issues experienced by a plurality of production nodes in a cloud computing system during a pre-production phase can be identified. A subset of the plurality of failure issues can be selected based at least in part on correlation with service outages for the plurality of production nodes during a production phase. A comparison can be performed between the subset of the plurality of failure issues and a set of failure issues experienced by a pre-production node during the pre-production phase. A risk score for the pre-production node can be calculated based at least in part on the comparison.

13 Claims, 11 Drawing Sheets

(51) Int. Cl.
    *H04L 41/0686*     (2022.01)
    *H04L 67/10*     (2022.01)

(58) Field of Classification Search
    CPC ............. G06F 11/0751; G06F 11/0793; G06F
              11/3006; G06F 11/3466; G06F 11/008;
                                   G06F 11/22
    See application file for complete search history.

200

300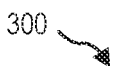

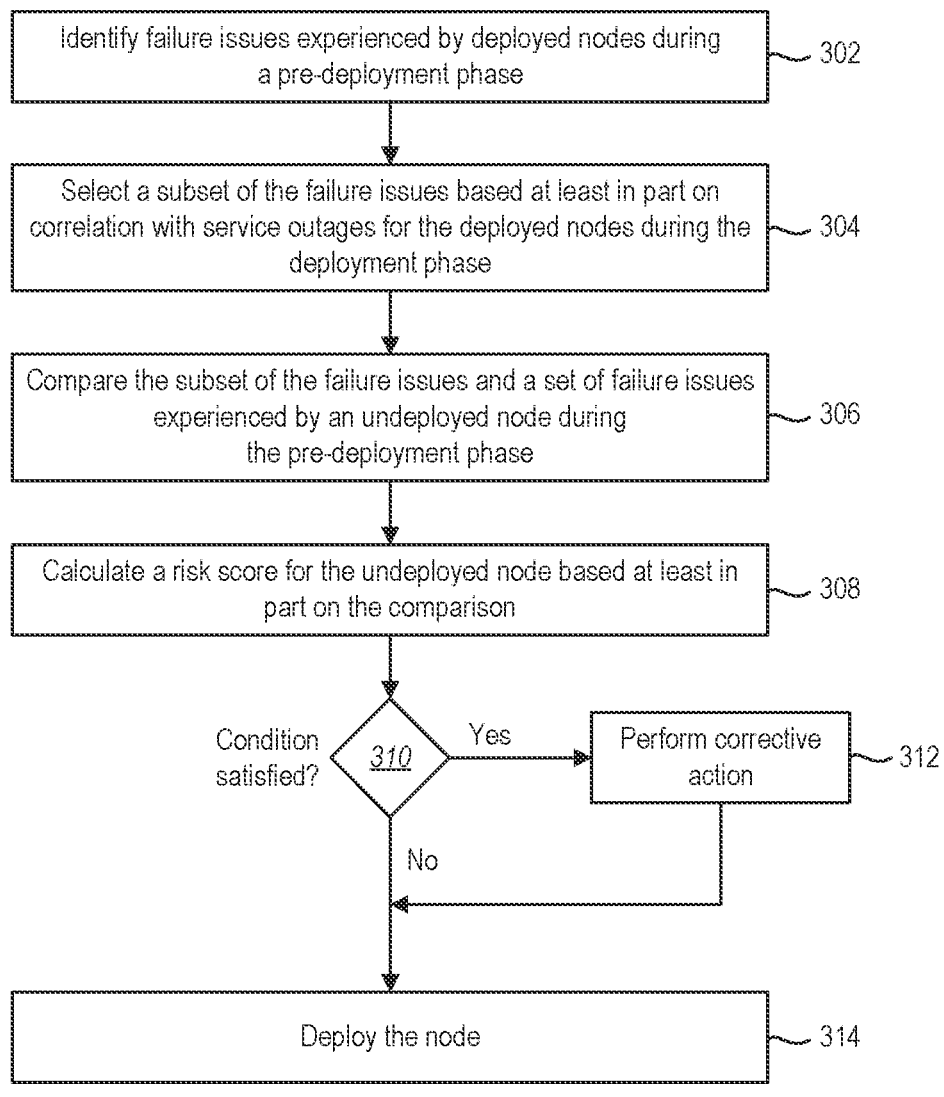

Identify failure issues experienced by deployed nodes during a pre-deployment phase — 302

Select a subset of the failure issues based at least in part on correlation with service outages for the deployed nodes during the deployment phase — 304

Compare the subset of the failure issues and a set of failure issues experienced by an undeployed node during the pre-deployment phase — 306

Calculate a risk score for the undeployed node based at least in part on the comparison — 308

Condition satisfied?    310    Yes    Perform corrective action — 312

No

Deploy the node — 314

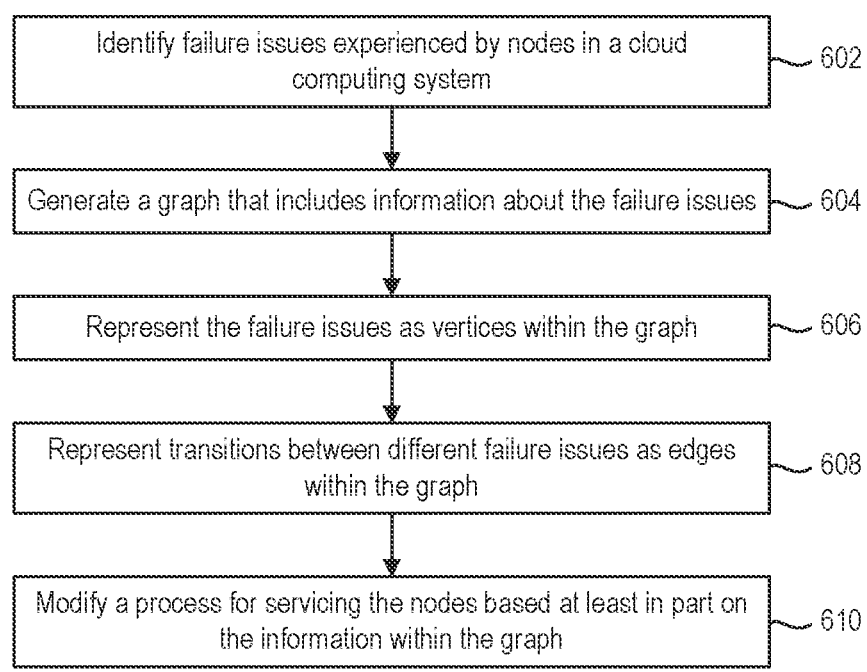

| Identify failure issues experienced by nodes in a cloud computing system | 602 |

| Generate a graph that includes information about the failure issues | 604 |

| Represent the failure issues as vertices within the graph | 606 |

| Represent transitions between different failure issues as edges within the graph | 608 |

| Modify a process for servicing the nodes based at least in part on the information within the graph | 610 |

FIG. 6

NODE HEALTH PREDICTION BASED ON FAILURE ISSUES EXPERIENCED PRIOR TO DEPLOYMENT IN A CLOUD COMPUTING SYSTEM

CROSS REFERENCE TO RELATED APPLICATIONS

This application is a Divisional of U.S. application Ser. No. 16/718,178, filed Dec. 17, 2019, which is incorporated herein by reference in its entirety.

BACKGROUND

Cloud computing is the delivery of computing services (e.g., servers, storage, databases, networking, software, analytics) over the Internet. There are many different types of cloud computing services offered by cloud computing providers. One type of cloud computing service provides computing resources (e.g., virtual machines) for users to host their workloads. Users can deploy applications by provisioning virtual machines on nodes that are owned and operated by the cloud computing provider. Users can choose to scale these computing resources up or down based on their needs.

It is important for the nodes that host computing resources for users to function reliably. Any interruption to service due to failures (e.g., hardware failures) on the nodes that host these computing resources has a negative impact on user experience and retention. Such failures can also have a detrimental impact on the cloud computing providers' available capacity and revenue, because the failed nodes will be in repair as opposed to generating revenue for the cloud computing provider. Accordingly, benefits can be realized by techniques for improving the reliability of nodes that are utilized by a cloud computing provider to host computing resources for users.

SUMMARY

In accordance with one aspect of the present disclosure, a method is disclosed that includes identifying a plurality of failure issues experienced by a plurality of production nodes in a cloud computing system during a pre-production phase. The method further includes selecting a subset of the plurality of failure issues based at least in part on correlation with service outages for the plurality of production nodes during a production phase. The method further includes performing a comparison between the subset of the plurality of failure issues and a set of failure issues experienced by a pre-production node during the pre-production phase. The method further includes calculating a risk score for the pre-production node based at least in part on the comparison. The method further includes performing corrective action with respect to the pre-production node based at least in part on the risk score. The corrective action is performed before the pre-production node enters the production phase.

Selecting the subset may include determining, for each failure issue of the plurality of failure issues, an average out of service metric for the plurality of production nodes that experienced the failure issue during the pre-production phase. Selecting the subset may also include selecting any failure issues whose average out of service metric satisfies a defined condition.

The average out of service metric for a failure issue may be an average value of an out of service metric calculated for the plurality of production nodes that experienced the failure issue. The out of service metric calculated for a production node may indicate how often the production node has been out of service since entering the production phase.

Identifying the plurality of failure issues may include obtaining a first set of test results from a first set of tests that a system integrator performs on the plurality of production nodes and obtaining a second set of test results from a second set of tests that a cloud computing provider performs on the plurality of production nodes.

The method may further include determining, for each failure issue of the plurality of failure issues, a frequency of occurrence metric that indicates how many of the plurality of production nodes experienced the failure issue during the pre-production phase.

The method may further include classifying the plurality of failure issues into a plurality of categories corresponding to different hardware components.

The corrective action may include at least one of repairing the pre-production node, replacing the pre-production node, replacing a component within the pre-production node, or placing the node in a state of probation.

The method may further include determining, for each failure issue of the plurality of failure issues, a mean time to repair metric. The method may further include prioritizing repairs based at least in part on the mean time to repair metric.

In accordance with another aspect of the present disclosure, a method is disclosed that includes identifying a plurality of failure issues experienced by a plurality of nodes in a cloud computing system. The method further includes generating a graph that includes information about the plurality of failure issues and representing the plurality of failure issues as vertices within the graph. The method further includes representing transitions between different failure issues as edges within the graph and modifying a process for servicing the plurality of nodes based at least in part on the information within the graph, thereby producing a modified process. The method further includes performing corrective action with respect to at least one pre-production node based at least in part on the modified process.

The graph may include a self-edge corresponding to a failure issue that has occurred repeatedly in at least some of the plurality of nodes. Modifying the process may include modifying how the failure issue is diagnosed or repaired.

A thickness of an edge within the graph may be proportional to a frequency of occurrence of a transition between two different failure issues.

The graph may include an edge corresponding to a transition between two different failure issues that has occurred in at least some of the plurality of nodes. Modifying the process may include modifying how at least one of the two different failure issues is diagnosed or repaired.

The graph may include a bi-directional-edge indicating that two different failure issues have occurred in succession in at least some of the plurality of nodes. Modifying the process may include modifying how at least one of the two different failure issues is diagnosed or repaired.

In accordance with another aspect of the present disclosure, a method is disclosed that includes providing test results associated with a pre-production node to a reliability prediction model. The test results are obtained from tests that are performed on the pre-production node during a pre-production phase. The reliability prediction model generates a risk score for the pre-production node based at least in part on the test results. The method further includes determining, based at least in part on the risk score, whether a condition is satisfied for performing corrective action to the pre-production node before the pre-production node is deployed in a cloud computing system. The method may further include performing the corrective action before the pre-production node is deployed in the cloud computing system when the condition is satisfied.

The test results may indicate that the pre-production node experienced a plurality of failure issues during the pre-production phase. The reliability prediction model may generate the risk score based at least in part on comparing the plurality of failure issues with a subset of failure issues experienced by a plurality of production nodes. The subset of failure issues may be correlated with service outages in the plurality of production nodes.

The test results may include a first set of test results from a first set of tests that a system integrator performs on a plurality of production nodes and a second set of test results from a second set of tests that a cloud computing provider performs on the plurality of production nodes.

The method may further include providing node specifications and data center information to the reliability prediction model. The reliability prediction model may generate the risk score for the pre-production node based at least in part on the node specifications and the data center information.

The corrective action may include at least one of repairing the pre-production node, replacing the pre-production node, replacing a component within the pre-production node, or placing the pre-production node in a state of probation.

The method may further include creating the reliability prediction model based at least in part on data collected from a plurality of production nodes and updating the reliability prediction model based at least in part on additional data collected from the plurality of production nodes and other nodes that are deployed after the reliability prediction model is initially created.

The method may further include generating the reliability prediction model based at least in part on previous test results.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 3 illustrates an example of a method that can be performed in order to improve the reliability of nodes that are deployed in a cloud computing system.

FIG. 6 illustrates an example of a method that can be performed in order to produce a visual representation of information about failure issues experienced by nodes and to use the visual representation to improve the reliability of nodes that are deployed in a cloud computing system.

DETAILED DESCRIPTION

Figure 1:
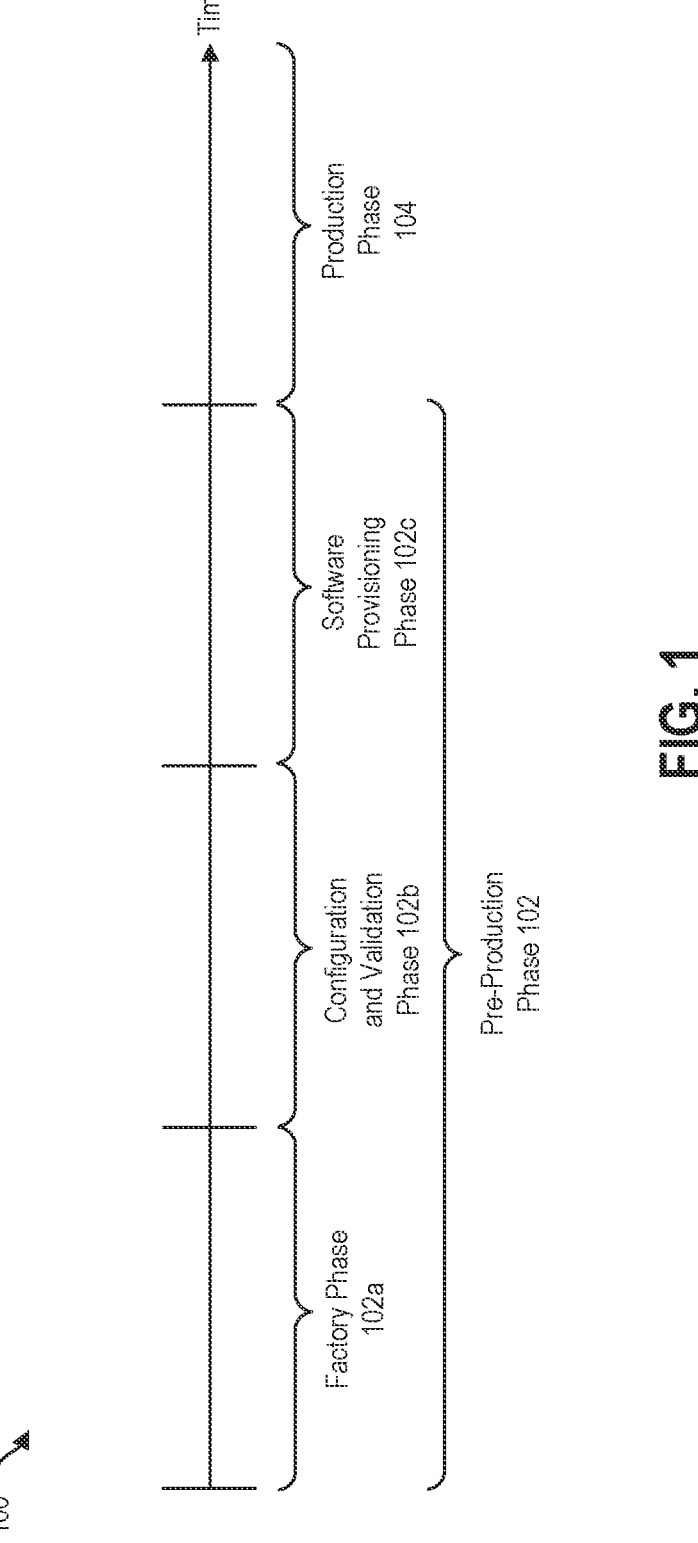
FIG. 1 illustrates an example of a lifecycle of a node that can be utilized by a cloud computing provider and deployed in a cloud computing system.

The present disclosure is generally related to improving the reliability of nodes that are utilized by a cloud computing provider to host computing resources for users. The techniques disclosed herein involve collecting and analyzing information about the entire lifecycle of nodes and predicting when nodes are likely to experience failures and go out of service based at least in part on early lifecycle errors.

The techniques disclosed herein can improve the health and reliability of nodes that are utilized by a cloud computing provider by identifying problematic nodes early in the hardware lifecycle. The techniques disclosed herein involve monitoring and tracking node hardware quality in the early hardware lifecycle to determine signatures of unhealthy nodes early in the capacity buildout process that have a detrimental effect in production and after the node is live taking traffic. Currently, there is no quantitative measure of how likely a node is to experience service outages (and thereby negatively affect the user experience) once it is in production. Swaps and repairs are done reactively in response to errors and warnings rather than proactively according to forecasted risks. This necessarily leads to an approach of mitigation rather than prevention.

The present disclosure addresses this problem by leveraging analytics and machine learning to monitor, track, and aggregate classes of hardware failures and actions taken to mitigate them. This can include determining information about the type of components that fail, the frequency of failures (which can be affected by a number of parameters such as transportation, warehousing, environment conditions, load and stress), the mean time to repair, and any remediation actions that are performed. If the repair time is high, actions can be taken to improve diagnostics. If replacement parts are needed, actions can be taken to improve the quality of spare parts and the placement of those parts.

Machine learning models can be utilized to predict whether a node is likely to experience component failure based at least in part on information from the early hardware lifecycle of the node and historical information about other nodes. When a component within a node is deemed likely to fail, the component can be repaired or replaced with a spare component if the repair time is time or resource intensive. This can reduce the likelihood of a node going into a repair status by utilizing information gained early in the hardware lifecycle.

Advantageously, in addition to improving hardware reliability, the techniques disclosed herein can reduce the amount of time that is required to deploy a cluster of nodes. This can be accomplished through the use of machine learning models to investigate and manage hardware failures based on the components that are failing and their associated failure patterns. The techniques disclosed herein can lead to an increase in available capacity when a cluster of nodes goes live, as well as an increased reliability of the overall fleet of nodes utilized by the cloud computing provider. By increasing available capacity in production, increasing the speed of buildout, and improving hardware reliability, a cloud computing provider can lower its cost of goods sold (COGS).

FIG. 1 illustrates an example of a lifecycle 100 of a node that can be utilized by a cloud computing provider and deployed in a cloud computing system. Broadly speaking, the lifecycle 100 of such a node can include two phases: a pre-production phase 102 and a production phase 104. During the production phase 104, the node can be used to perform cloud computing services (e.g., hosting workloads) for users. The production phase 104 can be referred to as being "in production." The pre-production phase 102 includes various actions (e.g., building and testing the node) that can be taken to prepare the node for the production phase 104. A node that has entered the production phase 104 may be referred to herein as a "production node," while a node that is still in the pre-production phase 102 may be referred to herein as a "pre-production node."

In the depicted example, the pre-production phase 102 includes a factory phase 102a, a configuration and validation phase 102b, and a software provisioning phase 102c.

A cloud computing provider typically obtains its nodes from one or more other entities. An entity that provides nodes to a cloud computing provider may be referred to herein as a system integrator. A system integrator can build a set of nodes, perform a series of tests on the nodes, and send the nodes that pass the tests to the cloud computing provider. The factory phase 102a for a particular node can refer to a period of time when a system integrator builds and tests the node.

When a cloud computing provider obtains a set of nodes from a system integrator, the cloud computing provider can also perform tests on the nodes. These tests can be similar to the tests that were performed by the system integrator. The configuration and validation phase 102b for a particular node can refer to a period of time when the node is tested by the cloud computing provider.

Nodes that pass the diagnostic tests performed during the configuration and validation phase 102b can proceed to the software provisioning phase 102c. The cloud computing provider may have a set of software components that implement the cloud computing services that are offered by the cloud computing provider. During the software provisioning phase 102c, the cloud computing provider can deploy these software components on the nodes. Once the software provisioning phase 102c has been completed for a particular node, then the node can proceed to the production phase 104.

When a cloud computing provider determines that additional capacity should be added to a cloud computing system, the cloud computing provider can add one or more nodes to the cloud computing system. Under some circumstances, the cloud computing provider can add one or more clusters of nodes to the cloud computing system. Each node that is added to the cloud computing system can go through the lifecycle 100 shown in FIG. 1.

Some of the nodes that are added to the cloud computing system can encounter one or more failure issues before they enter the production phase 104. For example, some nodes can encounter one or more failure issues during the factory phase 102a, the configuration and validation phase 102b, and/or the software provisioning phase 102c. Such nodes may be referred to herein as "unhealthy" nodes.

In this context, the term "failure issue" can refer to any type of failure that can be experienced by a node in a cloud computing system. In some embodiments, the term "failure issue" can refer to a failure of a hardware component, such as a central processing unit (CPU), random access memory (RAM), a hard disk drive (HDD), a solid state drive (SSD), other types of non-volatile memory, a network interface card (NIC), a graphics processing unit (GPU), a field programmable gate array (FPGA), a baseboard management controller (BMC), a cooling fan, a power supply unit (PSU), or the like. The techniques disclosed herein involve identifying and tracking statistically significant failure issues (e.g., hardware failures), including failure issues that occur early in the lifecycle 100 of a node (e.g., in the pre-production phase 102). These early node lifecycle failures can have a lasting effect on a node's out of service rate. These failure issues can be classified into meaningful categories, as will be discussed in greater detail below. Based on statistical significance testing, a determination can be made about the categories in which hardware failures correlate with future impact on out of service rates. This information can then be used to make predictions about the reliability of a node based at least in part on failure issues that the node has experienced.

Figure 1A:
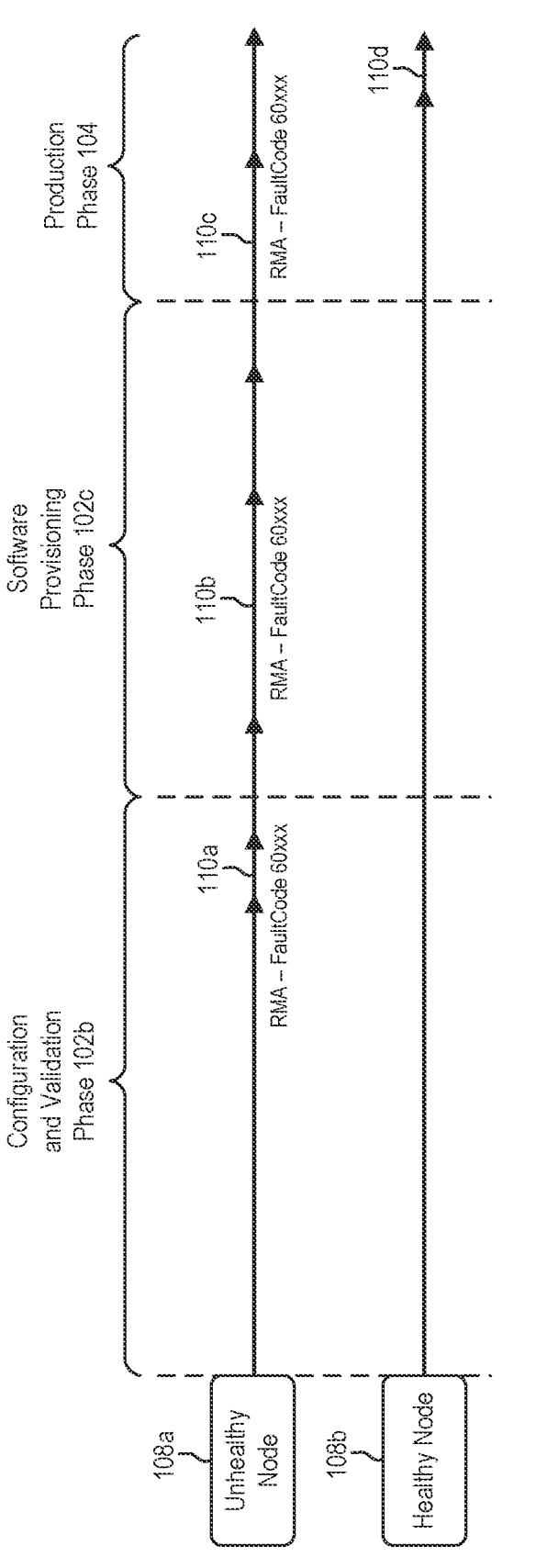
FIG. 1A illustrates examples of failure issues that can be experienced by an unhealthy node.

FIG. 1A illustrates examples of failure issues 110a-c that can be experienced by an unhealthy node 108a. In the depicted example, the unhealthy node 108a experiences a first failure issue 110a in the configuration and validation phase 102b. The unhealthy node 108a experiences a second failure issue 110b in the software provisioning phase 102c. The unhealthy node 108a experiences a third failure issue 110c beginning in the software provisioning phase 102c and continuing into the production phase 104.

The healthy node 108b does not experience any failure issues during the configuration and validation phase 102b or the software provisioning phase 102c. In the depicted example, the healthy node 108b is shown experiencing a failure issue 110d during the production phase 104. However, this failure issue 110d does not prevent the node 108b from being considered to be healthy. The failure issue 110d could be unrelated to hardware on the node 108b. For example, the failure issue 110d could be a software problem. In the depicted example, whether a node is considered to be healthy or unhealthy depends on failure issues that occur prior to the production phase 104.

One aspect of the present disclosure is a fully automated platform to track such unhealthy nodes early in the node lifecycle. A risk score for an unhealthy node can be predicted based on the hardware errors it may have initially encountered. The risk score can indicate the likelihood that the node will go into an out-of-service status in production. The risk score can be used to carry out systematic actions to increase buildout speed and increase capacity.

Figure 2:
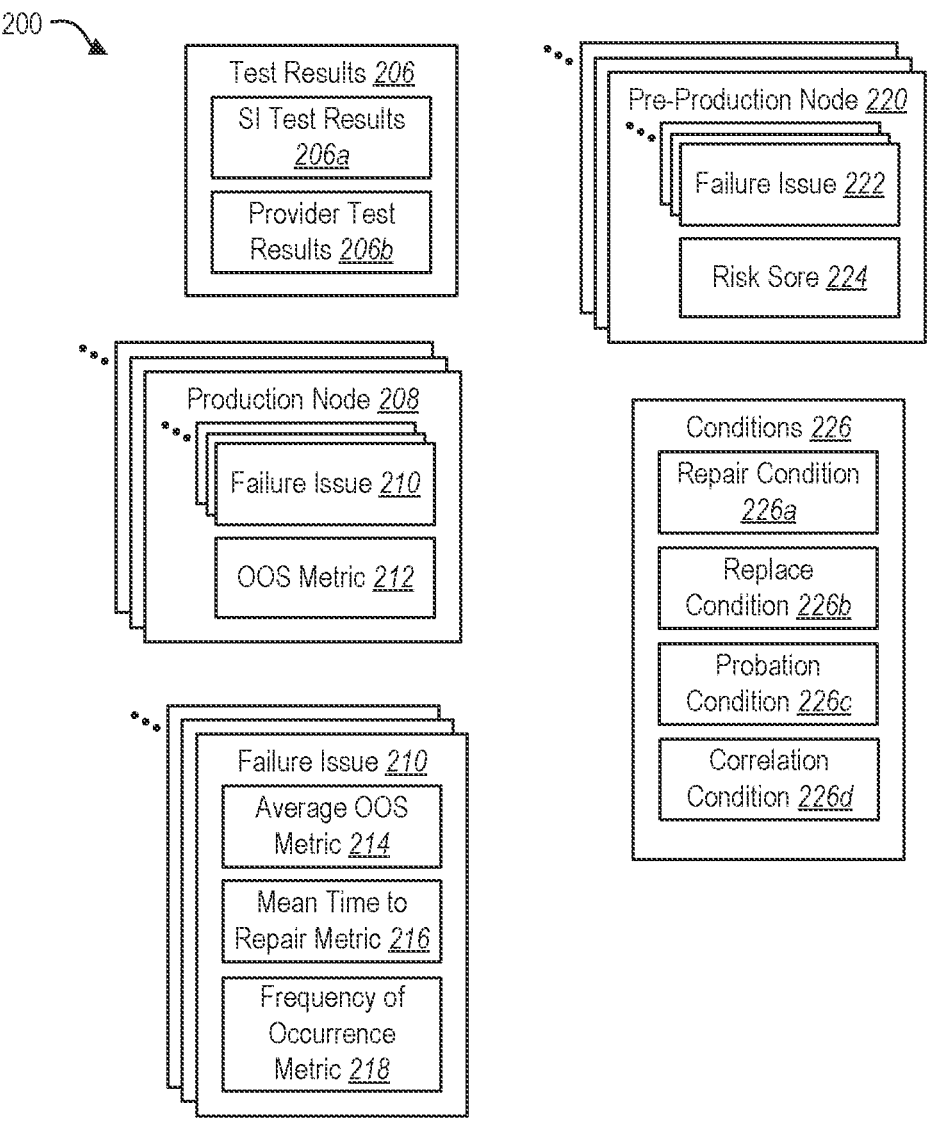
FIG. 2 illustrates examples of data that can be used to facilitate the techniques disclosed herein.

FIG. 2 illustrates examples of data 200 that can be used to facilitate the techniques disclosed herein. The data 200 shown in FIG. 2 includes test results 206 corresponding to production nodes 208 (i.e., nodes that have entered the production phase 104). The test results 206 can include test results 206*a* from tests that a system integrator performs on the production nodes 208. Such test results 206*a* may be referred to herein as system integrator (SI) test results 206*a*. The test results 206 can also include test results 206*b* from tests that a cloud computing provider performs on the production nodes 208. Such test results 206*b* may be referred to herein as provider test results 206*b*. In some embodiments, the SI test results 206*a* corresponding to a particular node can be obtained from tests that the system integrator performs on the node during the factory phase 102*a*, and the provider test results 206*b* corresponding to the node can be obtained from tests that the cloud computing provider performs on the node during the configuration and validation phase 102*b* and/or the software provisioning phase 102*c*.

The data 200 shown in FIG. 2 also includes data 200 that is related to production nodes 208. The data 200 about a particular production node 208 can include data 200 about one or more failure issues 210 that were experienced by that production node 208 during the pre-production phase 102.

The data 200 about a particular production node 208 can also include an out of service (OOS) metric 212. The OOS metric 212 that is determined for a particular production node 208 can indicate how often the production node 208 has been out of service since the production node 208 entered the production phase 104. In some embodiments, the OOS metric 212 can be expressed as a percentage of the amount of time that the production node 208 has been out of service since entering the production phase 104 relative to the total amount of time that has elapsed since the production node 208 entered the production phase 104. For example, the OOS metric 212 can be expressed as in equation (1):

$$OOSDayPercent = \frac{NonProductionDays}{ObservedLiveDays} \times 100 \qquad (1)$$

In equation (1), the term NonProductionDays can refer to the number of observed days in which the node is in any state other than a Production state. In this context, a node can be considered to be in the Production state when the node is being used to perform cloud computing services (e.g., hosting workloads) for users. In some embodiments, if a node is out of service even for just a few minutes, the node can be considered to be out of service for the entire day. This implies a high cost for an out of service time for an unhealthy node.

The data 200 shown in FIG. 2 also includes data 200 that is related to particular failure issues 210. The data 200 about a particular failure issue 210 can include an average OOS metric 214. The average OOS metric 214 for a particular failure issue 210 can represent an average value of the OOS metric 212 for the production nodes 208 that experienced that failure issue 210 during the pre-production phase 102. For example, if N production nodes 208 experienced a particular failure issue 210 during the pre-production phase 102 (where N can be any positive integer), then the average OOS metric 214 for that failure issue 210 can be the average value of the N OOS metrics 212 corresponding to the N production nodes 208 that experienced the failure issue 210.

The data 200 about a particular failure issue 210 can also include a mean time to repair metric 216 and a frequency of occurrence metric 218. The mean time to repair metric 216 that is determined for a particular failure issue 210 can indicate the average amount of time that it takes to repair that failure issue 210. The frequency of occurrence metric 218 that is determined for a particular failure issue 210 can indicate the number of times that the failure issue has occurred among the production nodes 208.

The data 200 shown in FIG. 2 also includes data 200 that is related to pre-production nodes 220. The data 200 about a particular pre-production node 220 can include data 200 about one or more failure issues 222 that were experienced by that pre-production node 220 during the pre-production phase 102.

The data 200 about a particular pre-production node 220 can also include a risk score 224. The risk score 224 that is calculated for a particular pre-production node 220 can indicate the likelihood that the pre-production node 220 will have a high out of service rate in the production phase 104. In other words, the risk score 224 can be a prediction of how reliable the pre-production node 220 will be after the pre-production node 220 has gone in production. The risk score 224 for a particular pre-production node 220 can be calculated based on a comparison of (i) the failure issues 222 that were experienced by that pre-production node 220 during the pre-production phase 102, and (ii) the failure issues 210 that were experienced by the production nodes 208 during the pre-production phase 102 and that correlated with high out of service rates (as indicated by the OOS metrics 212) for the production nodes 208 during the production phase 104.

The data 200 shown in FIG. 2 also includes rules that define conditions under which certain actions can be taken. For example, one or more conditions 226 can be defined that indicate when corrective action should be taken in response to the comparison of (i) and (ii) described above. These conditions 226 can include a repair condition 226*a* that indicates when a pre-production node 220 should be repaired before entering the production phase 104 and a replace condition 226*b* that indicates when a pre-production node 220 should be replaced with another node (or when a component of a pre-production node 220 should be replaced with another component). In some embodiments, the repair condition 226*a* and the replace condition 226*b* can be associated with a date when a cluster of nodes is estimated to be in production (to go live). If the estimated amount of time to repair the node (based on the mean time to repair metric 216 corresponding to the failure issue 210 that the node is experiencing) exceeds the amount of time that remains before the cluster is estimated to be in production, then this can indicate that the node should be replaced rather than repaired. The conditions 226 can also include a probation condition 226*c* that indicates when a pre-production node 220 should be placed in a state of probation.

In addition, a condition 226*d* can be defined that indicates when the failure issues 210 that were experienced by the production nodes 208 during the pre-production phase 102 are correlated with high out of service rates for the production nodes 208 during the production phase 104. Such a condition 226*d* may be referred to herein as a correlation condition 226*d*.

In some embodiments, the correlation condition 226d can be related to a threshold value for an average OOS metric 214 that corresponds to a particular failure issue 210. In embodiments where higher values of the OOS metric 212 and the average OOS metric 214 correspond to higher out of service rates, the correlation condition 226d can define a minimum value for the average OOS metric 214. For example, the correlation condition 226d can indicate that a failure issue 210 that was experienced by the production nodes 208 during the pre-production phase 102 is correlated with high out of service rates for the production nodes 208 during the production phase 104 if the average OOS metric 214 for the failure issue 210 is greater than or equal to a defined minimum value.

In some embodiments, the correlation condition 226d can be related to both a threshold value for an average OOS metric 214 that corresponds to a particular failure issue 210, and a threshold value for a frequency of occurrence metric 218 that corresponds to a particular failure issue 210. For example, the correlation condition 226d can indicate that a failure issue 210 that was experienced by the production nodes 208 during the pre-production phase 102 is correlated with high out of service rates for the production nodes 208 during the production phase 104 if (i) the average OOS metric 214 for the failure issue 210 is greater than or equal to a defined minimum value for the average OOS metric 214 (assuming that higher values of the average OOS metric 214 correspond to higher out of service rates), and (ii) the frequency of occurrence metric 218 corresponding to the failure issue 210 is above a defined minimum value for the frequency of occurrence metric 218 (assuming that higher values of the frequency of occurrence metric 218 correspond to a higher frequency of occurrence).

Alternatively, in embodiments where lower values of the OOS metric 212 and the average OOS metric 214 correspond to higher out of service rates, the correlation condition 226d can define a maximum value for the average OOS metric 214. For example, the correlation condition 226d can indicate that a failure issue 210 that was experienced by the production nodes 208 during the pre-production phase 102 is correlated with high out of service rates for the production nodes 208 during the production phase 104 if the average OOS metric 214 for the failure issue 210 is less than or equal to a defined maximum value.

FIG. 3 illustrates an example of a method 300 that can be performed in order to improve the reliability of nodes that are deployed in a cloud computing system. The method 300 can include identifying 302 failure issues 210 experienced by production nodes 208 during a pre-production phase 102.

The method 300 can also include selecting 304 a subset of these failure issues 210 based at least in part on correlation with service outages for the production nodes 208 during the production phase 104. In this context, the term "service outage" can refer to some period of time when a production node 208 is not in service (e.g., not providing cloud computing services to users). In some embodiments, selecting 304 a subset of failure issues 210 based at least in part on correlation with service outages for the production nodes 208 during the production phase 104 can include calculating an average OOS metric 214 and a frequency of occurrence metric 218 for each failure issue 210 and then selecting any failure issues 210 whose average OOS metric 214 satisfies a defined condition such as the correlation condition 226d discussed previously.

As indicated above, the average OOS metric 214 for a particular failure issue 210 can represent an average value of the OOS metric 212 for the production nodes 208 that experienced that failure issue 210 during the pre-production phase 102. In embodiments where higher values of the OOS metric 212 and the average OOS metric 214 correspond to higher out of service rates, selecting failure issues 210 whose average OOS metric 214 satisfies the correlation condition 226d can include selecting failure issues 210 whose average OOS metric 214 is greater than or equal to a defined minimum value. Alternatively, in embodiments where lower values of the OOS metric 212 and the average OOS metric 214 correspond to higher out of service rates, selecting failure issues 210 whose average OOS metric 214 satisfies the correlation condition 226d can include selecting failure issues 210 whose average OOS metric 214 is less than or equal to a defined maximum value.

The subset of the failure issues 210 that correlate with service outages for the production nodes 208 during the production phase 104 can be used to calculate a risk score 224 for a pre-production node 220. In particular, the method 300 can include comparing 306 (i) the subset of the failure issues 210 experienced by the production nodes 208 during the pre-production phase 102 that correlate with service outages for the production nodes 208 during the production phase 104, and (ii) the failure issues 222 experienced by a pre-production node 220 during the pre-production phase 102. Based at least in part on this comparison, a risk score 224 can be calculated 308 for the pre-production node 220.

The method 300 can include determining 310, based at least in part on the risk score 224, whether a condition 226 has been satisfied for performing corrective action with respect to the pre-production node 220 before the pre-production node 220 enters the production phase 104. For example, the method 300 can include determining 310 whether a repair condition 226a has been satisfied. The repair condition 226a can indicate when a pre-production node 220 should be repaired before entering the production phase 104. As another example, the method 300 can include determining 310 whether a replace condition 226b has been satisfied. The replace condition 226b can indicate when a pre-production node 220 should be replaced (or a component within the pre-production node 220 should be replaced) before entering the production phase 104.

If it is determined 310 that a condition 226 has been satisfied for performing corrective action before the pre-production node 220 enters the production phase 104, then the method 300 can also include performing 312 the corrective action. For example, if it is determined 310 that a repair condition 226a has been satisfied, then the method 300 can include repairing the pre-production node 220. If it is determined 310 that a replace condition 226b has been satisfied, then the method 300 can include replacing the pre-production node 220 (or replacing a component within the pre-production node 220). Once the corrective action has been performed 312, then the method 300 can proceed to deploying 314 the pre-production node 220 (or a replacement node). In other words, the pre-production node 220 (or a replacement node) can enter the production phase 104.

On the other hand, if it is determined 310 that a condition 226 has not been satisfied for performing corrective action before the pre-production node 220 enters the production phase 104, then the method 300 can proceed to deploying 314 the pre-production node 220 without performing any corrective action.

Figure 4:
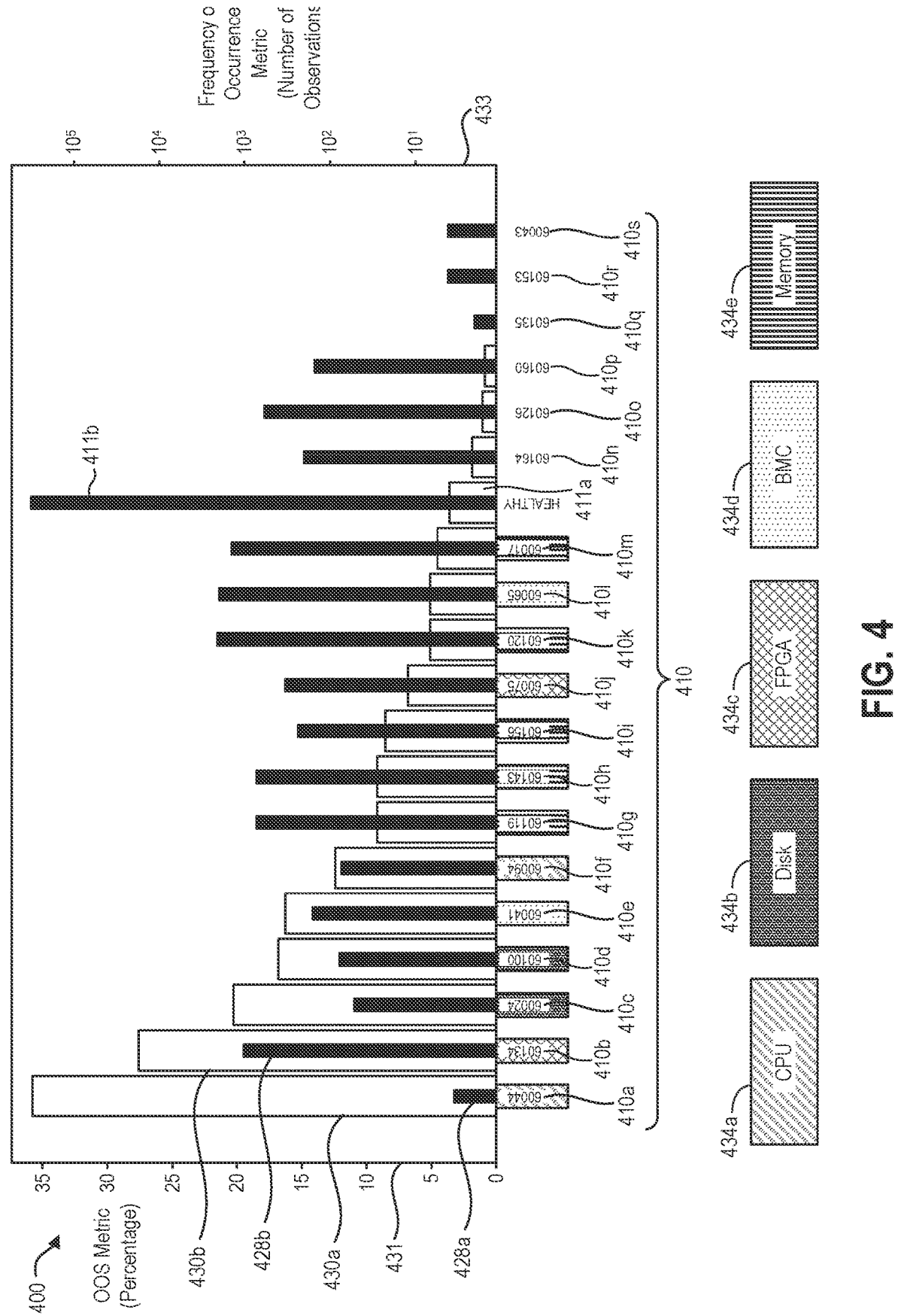
FIG. 4 is a bar graph that illustrates an example showing how failure issues that are correlated with high out of service rates for production nodes during the production phase can be selected.

FIG. 4 is a bar graph 400 that illustrates an example showing how failure issues 410 that are correlated with high out of service rates for production nodes 208 during the production phase 104 can be selected. The x-axis of the bar graph 400 includes a plurality of different failure issues 410 that have been experienced by a plurality of nodes during the pre-production phase 102. The failure issues 410 are indicated by numerical identifiers. For example, the numerical identifier "60044" represents one type of failure issue 410a, the numerical identifier "60134" represents another type of failure issue 410b, and so forth. The numerical identifiers can be fault codes that are used to represent the failure issues 410.

There are two different types of bars shown in the bar graph 400. The black bars represent values of the frequency of occurrence metric 218 that have been determined for the various failure issues 410 that are shown along the x-axis. For example, the black bar 428a on the far left side of the bar graph 400 represents the value of the frequency of occurrence metric 218 that has been determined for the failure issue 410a represented by the numerical identifier "60044," the next black bar 428b represents the value of the frequency of occurrence metric 218 that has been determined for the failure issue 410b represented by the numerical identifier "60134," and so forth. The white bars represent the value of the average OOS metric 214 that has been calculated for production nodes 208 that have experienced the failure issues 410 that are shown along the x-axis. For example, the white bar 430a on the far left side of the bar graph 400 represents the value of the average OOS metric 214 that has been calculated for production nodes 208 that have experienced the failure issue 410a represented by the numerical identifier "60044," the next white bar 430b represents the value of the average OOS metric 214 that has been calculated for production nodes 208 that have experienced the failure issue 410b represented by the numerical identifier "60134," and so forth.

The vertical axis 433 on the right side of the bar graph 400 represents values of the frequency of occurrence metric 218. The vertical axis 433 has a logarithmic scale. In the depicted example, the frequency of occurrence metric 218 is represented as the number of times that a particular failure issue has been observed in the pre-production phase 102 for the production nodes 208 under consideration. For example, the height of the first black bar 428a is below $10^1$, indicating that the failure issue 410a represented by the numerical identifier "60044" occurred fewer than ten times in the production nodes 208 under consideration. The height of the second black bar 428b is slightly above $10^3$, indicating that the failure issue 410b represented by the numerical identifier "60134" occurred more than 1000 times in the production nodes 208 under consideration.

The vertical axis 431 on the left side of the bar graph 400 represents values of the average OOS metric 214. In the depicted example, the average OOS metric 214 is represented as a percentage. For example, the height of the first white bar 430a is slightly above 35%, indicating that the value of the average OOS metric 214 that has been calculated for production nodes 208 that have experienced the failure issue 410a represented by the numerical identifier "60044" is slightly above 35%. The height of the second white bar 430b is between 25% and 30%, indicating that the value of the average OOS metric 214 that has been calculated for production nodes 208 that have experienced the failure issue 410b represented by the numerical identifier "60134" is between 25% and 30%.

Whether a failure issue 410 correlates in a statistically significant way with a deployed node 208 going out of service for a significant amount of time during the production phase 104 depends on both (i) the value of the frequency of occurrence metric 218 that has been determined for the failure issue 410, and (ii) the value of the average OOS metric 214 that has been calculated for production nodes 208 that have experienced the failure issue 410.

For example, consider the failure issue 410a represented by the numerical identifier "60044." The value of the average OOS metric 214 that has been calculated for production nodes 208 that have experienced this failure issue 410a is relatively high (above 35%). However, the value of the frequency of occurrence metric 218 for this failure issue 410a is relatively low (fewer than ten observations). Therefore, it may not be reasonable to conclude that this failure issue 410a correlates with a high out of service rate in the production phase 104, because the failure issue 410a hasn't been observed enough times to justify such a conclusion.

On the other hand, consider the failure issue 410b represented by the numerical identifier "60134." The value of the average OOS metric 214 that has been calculated for production nodes 208 that have experienced this failure issue 410b is relatively high (between 25% and 30%), and the value of the frequency of occurrence metric 218 for this failure issue 410b is also relatively high (more than $10^3$ observations). Because the value of the average OOS metric 214 and the frequency of occurrence metric 218 are both relatively high, it may be reasonable to conclude that this failure issue 410b correlates with a high out of service rate in the production phase 104.

In some embodiments, a failure issue 410 that occurs during the pre-production phase 102 can be considered to be correlated in a statistically significant way with a deployed node 208 going out of service for a significant amount of time during the production phase 104 if (i) the value of the frequency of occurrence metric 218 that has been determined for the failure issue 410 exceeds a threshold value that has been defined for the frequency of occurrence metric 218, and (ii) the value of the average OOS metric 214 that has been calculated for production nodes 208 that have experienced the failure issue 410 exceeds a threshold value that has been defined for the average OOS metric 214.

As an example, suppose that a threshold value of ten is defined for the frequency of occurrence metric 218, and a threshold value of 20% is defined for the average OOS metric 214. In this case, the failure issue 410a represented by the numerical identifier "60044" would not be considered to correlate in a statistically significant way with a deployed node 208 going out of service for a significant amount of time during the production phase 104 because the value of the frequency of occurrence metric 218 for this failure issue 410a does not exceed the defined threshold value. On the other hand, the failure issue 410b represented by the numerical identifier "60134" would be considered to correlate in a statistically significant way with a deployed node 208 going out of service for a significant amount of time during the production phase 104 because the value of the frequency of occurrence metric 218 for this failure issue 410b and the value of the average OOS metric 214 for this failure issue 410b both exceed the respective threshold values. Of course, the specific threshold values used in this example are provided for demonstration purposes only and should not be interpreted as limiting the scope of the present disclosure.

For comparison purposes, the bar graph 400 also includes a representation of the frequency of occurrence metric 218 and the average OOS metric 214 for healthy nodes. In some embodiments, healthy nodes can be defined as production nodes 208 that did not experience any failure issues during the pre-production phase 102. The white bar 411a represents the average OOS metric 214 for healthy nodes, and the black bar 411b represents the frequency of occurrence metric 218 for healthy nodes. As indicated by the white bar 411a, the value of the average OOS metric 214 for healthy nodes is relatively low. This indicates that healthy nodes have low out of service rates during the production phase 104 (as would be expected). As indicated by the black bar 411*b*, the value of the frequency of occurrence metric 218 is relatively high for healthy nodes. This indicates that most nodes do not experience failure issues during the pre-production phase 102.

The threshold value for the average OOS metric 214 can be defined in relation to the average OOS metric 214 for healthy nodes. For example, in some embodiments, a failure issue 410 may not be considered as correlating in a statistically significant way with a deployed node 208 going out of service for a significant amount of time during the production phase 104 unless the average OOS metric 214 for the failure issue 410 exceeds the average OOS metric 214 for healthy nodes.

The failure issues 410 can be defined in such a way that a plurality of different failure issues 410 can correspond to the same hardware component. In some embodiments, the failure issues 410 that correlate in a statistically significant way with a production node 208 going out of service in the production phase 104 can be classified based on particular types of hardware components to which the failure issues 410 correspond.

In the example shown in FIG. 4, there are five categories of hardware components: a CPU 434*a*, a hard disk 434*b*, a field programmable gate array (FPGA) 434*c*, a baseboard management controller (BMC) 434*d*, and memory 434*e*. The failure issues 410*a*, 410*f* have been classified as corresponding to the CPU 434*a*. The failure issues 410*c*, 410*d* have been classified as corresponding to the hard disk 434*b*. The failure issues 410*b*, 410*j* have been classified as corresponding to the FPGA 434*c*. The failure issues 410*e*, 410*l* have been classified as corresponding to the BMC 434*d*. The failure issues 410*g*, 410*h*, 410*i*, 410*k*, 410*m* have been classified as corresponding to the memory 434*e*. The average OOS metric 214 for the failure issues 410*n*-*s* is less than the average OOS metric 214 for healthy nodes, and so in the depicted example these failure issues 410*n*-*s* are not classified as corresponding to particular hardware components.

Figure 5:
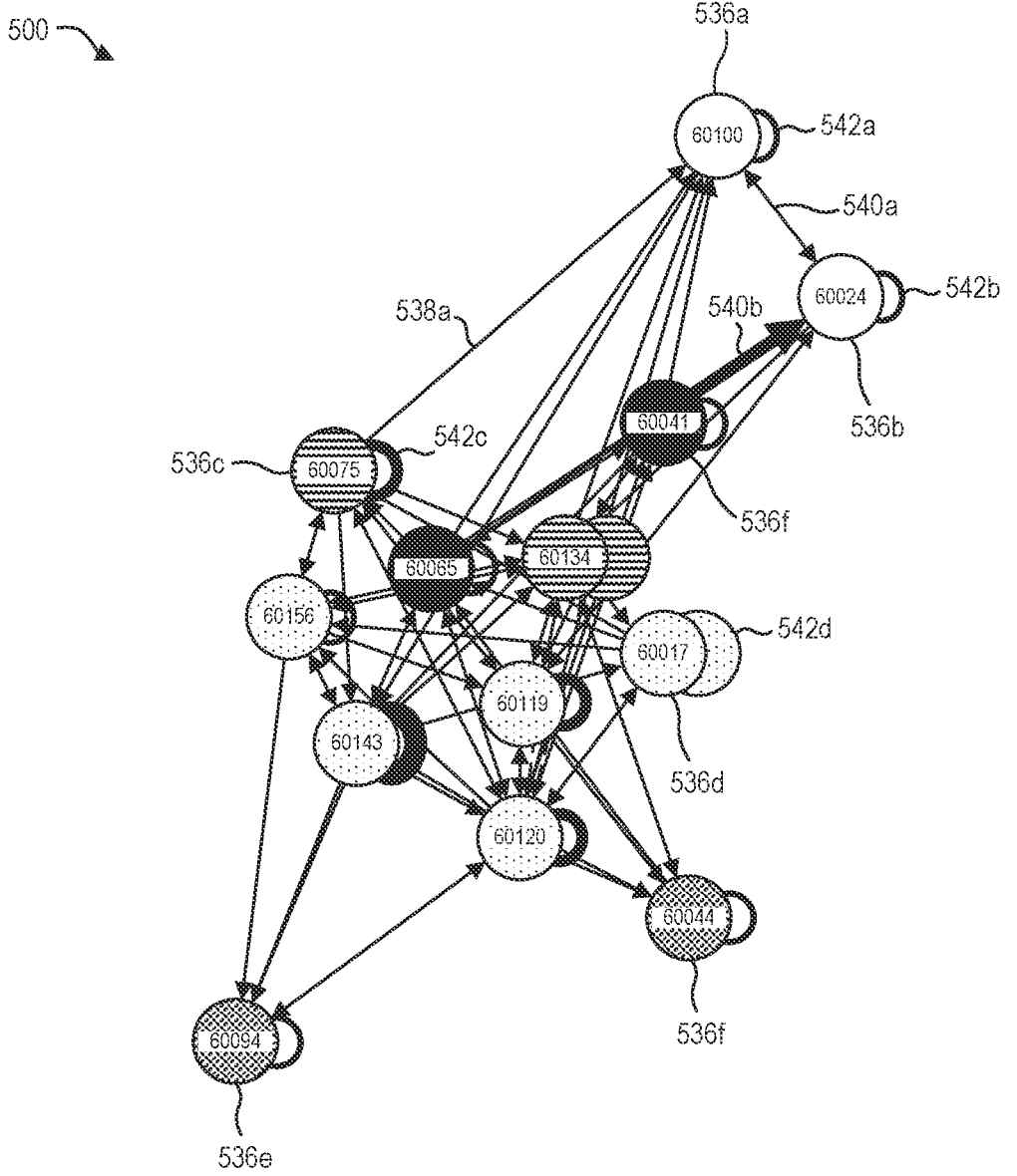
FIG. 5 illustrates an example of a graph that can be generated to provide a visual representation of information about failure issues experienced by nodes.

Another aspect of the present disclosure is related to generating a visual representation of information about failure issues experienced by nodes. In some embodiments, the visual representation can take the form of a graph. FIG. 5 illustrates an example of a graph 500 that can be generated to provide a visual representation of information about failure issues experienced by nodes.

In the depicted example, the graph 500 includes a plurality of vertices and a plurality of edges between the vertices. The failure issues experienced by nodes can be represented as vertices within the graph 500. For example, the vertex 536*a* that is labeled with the numerical identifier "60100" represents one type of failure issue, the vertex 536*b* that is labeled with the numerical identifier "60024" represents another type of failure issue, the vertex 536*c* that is labeled with the numerical identifier "60075" represents another type of failure issue, the vertex 536*d* that is labeled with the numerical identifier "60017" represents another type of failure issue, and so forth. As before, the numerical identifiers can be fault codes that are used to represent the failure issues 410. In some embodiments, only failure issues that are significant (e.g., that occur more than a threshold number of times) are represented in the graph 500.

Transitions between different failure issues can be represented as directed edges within the graph 500. For example, the graph 500 includes a directed edge 538*a* between the vertex 536*c* that is labeled "60075" and the vertex 536*a* that is labeled "60100." This means that at least some nodes experienced the failure issue that is represented by the numerical identifier "60075" followed by the failure issue that is represented by the numerical identifier "60100," without any other failure issues being experienced between those two failure issues.

The graph 500 also includes several bi-directional edges. A bi-directional edge can indicate that two different failure issues have occurred in succession in at least some nodes. For example, the graph 500 includes a bi-directional edge 540*a* between the vertex 536*a* that is labeled "60100" and the vertex 536*b* that is labeled "60024." In some cases, this could mean that at least some nodes experienced the failure issue that is represented by the numerical identifier "60100" and the failure issue that is represented by the numerical identifier "60024" in an oscillating pattern (e.g., "60100"→"60024"→"60100"→"60024"). In other cases, this could mean that at least some nodes experienced the failure issue that is represented by the numerical identifier "60100" followed by the failure issue that is represented by the numerical identifier "60024," while other nodes experienced the failure issue that is represented by the numerical identifier "60024" followed by the failure issue that is represented by the numerical identifier "60100."

Certain groups are disjoint sets indicating no co-occurrence of disconnected fault codes and therefore disjoint underlying causes. For example, the vertex 536*a* and the vertex 536*e* are not connected by any transitions. Therefore, it can be assumed that these vertices 536*a*, 536*e* represent unrelated failure issues.

The graph 500 also includes several self-edges. In this context, the term "self-edge" can refer to an edge that begins and ends at the same node. For example, the vertex 536*a* that is labeled "60100" includes a self-edge 542*a*, the vertex 536*b* that is labeled "60024" includes a self-edge 542*b*, the vertex 536*c* that is labeled "60075" includes a self-edge 542*c*, the vertex 536*d* that is labeled "60017" includes a self-edge 542*d*, and so forth. A self-edge indicates that a failure issue has occurred repeatedly in at least some nodes. For example, the self-edge 542*a* corresponding to the vertex 536*a* that is labeled "60100" indicates that the failure issue that is represented by the numerical identifier "60100" has occurred repeatedly (e.g., "60100"→"60100"→"60100"→"60100") in some nodes.

In the depicted graph 500, the thickness of an edge within the graph 500 is proportional to a frequency of occurrence of a transition between two different failure issues. If an edge is relatively thick, this indicates that the transition that it represents has occurred relatively frequently. On the other hand, if an edge is relatively thin, this indicates that the transition that it represents has occurred relatively infrequently. This principle applies to directed edges (e.g., the directed edge 538*a* between the vertices 536*c*, 536*a*), bi-directional edges (e.g., the bi-directional edge 540*a* between the vertices 536*a*, 536*b*), and self-edges (e.g., the self-edges 542*a*-*d*). As an example, the self-edge 542*d* corresponding to the vertex 536*d* that is labeled "60017" is thicker than the self-edge 542*c* corresponding to the vertex 536*c* that is labeled "60075." This means that the number of nodes that have repeatedly experienced the failure issue that is represented by the numerical identifier "60017" is greater than the number of nodes that have repeatedly experienced the failure issue that is represented by the numerical identifier "60075."

The graph 500 can be used to evaluate the effectiveness of the manner in which nodes within the cloud computing system are serviced. Certain characteristics of the graph 500 can indicate problems with diagnosis or repair. For example, the edges between the vertices can indicate how well the fault code diagnostics are working to address correlations and associated repairs. Unrelated vertices (vertices that are not connected to one another by any edges) can indicate that there are robust diagnostics and repairs being performed for these issues by the technician(s). For example, the vertex 536*a* that is labeled "60100" and the vertex 536*e* that is labeled "60094" are unrelated vertices because they are not directly connected to each other by any edges. The fact that these vertices 536*a*, 536*e* are unrelated is a good sign, because it indicates that these failure issues are distinct from one another.

On the other hand, edges that directly connect vertices can indicate a potential problem with diagnosis and/or with repair. This is particularly true where there are significant (e.g., thick) edges indicating a large number of transitions. For example, the edge 540*b* between the vertex 536*f* that is labeled "60041" and the vertex 536*b* that is labeled "60024" is thicker than other edges in the graph 500, indicating that the transition between these two failure issues ("60041"→"60024") occurs more frequently than the transition between other failure issues. This can indicate a potential problem with repair and/or diagnosis. For example, perhaps the repair that is being performed in response to the first failure issue ("60041") is causing the second failure issue ("60024"). Alternatively, perhaps there is only one problem, but that problem is being diagnosed as two separate failure issues. The presence of this significant edge 540*b* in the graph 500 presents an opportunity to improve diagnostics and repair to minimize the overlap of fault codes for the unhealthy nodes that are in a repair state.

As another example, the presence of self-edges (e.g., the self-edges 542*a*-*d*) can indicate that certain problems are not being repaired correctly, especially if the self-edges are relatively thick (e.g., the self-edge 542*d*). As indicated above, a self-edge indicates that some nodes are repeatedly experiencing the same failure issue. The thicker the self-edge, the greater the number of nodes that are repeatedly experiencing that failure issue. For example, the self-edge 542*d* is thicker than several other self-edges 542*a*-*c* in the graph 500. This indicates that the failure issue that is represented by the numerical identifier "60017" has occurred repeatedly in a relatively large number of nodes. By simply looking at the graph 500, a technician or system administrator can infer that there is some problem with the diagnosis and/or the repair of the failure issue that is represented by the numerical identifier "60017."

In addition, the presence of bi-directional edges (e.g., the bi-directional edge 540*a*) can indicate a hardware fault churn where the failure issue oscillates between two fault codes. As indicated above, the bi-directional edge 540*a* between the vertex 536*a* that is labeled "60100" and the vertex 536*b* that is labeled "60024" could mean that at least some nodes experienced the failure issue that is represented by the numerical identifier "60100" and the failure issue that is represented by the numerical identifier "60024" in an oscillating pattern (e.g., "60100"→"60024"→"60100"→"60024"). This could indicate a potential problem with the way that these failure issues are being repaired. For example, the repair for the failure issue that is represented by the numerical identifier "60100" could be causing the failure issue that is represented by the numerical identifier "60024," and vice versa. By simply looking at the graph 500, a technician or system administrator can infer that there is some problem with the diagnosis and/or the repair of the failure issues that are represented by the numerical identifiers "60100" and "60024."

The graph 500 also makes it possible to identify common patterns that are present in hardware failures in the early lifecycle (e.g., in the pre-production phase 102). If there are certain failure codes (or sequences of failure codes) that frequently appear on walks through the graph 500, this can be an indicator of one or more problems with the way in which nodes are being diagnosed and/or repaired.

Under some circumstances, an unhealthy node can be diagnosed by a human technician who attempts to address the root cause behind the problematic node and eventually move the node back into production. The graph 500 can be used to track the quality of diagnostics and quality of repair that are carried out by a field technician.

The vertices within the graph 500 that correspond to related failure issues can be represented with the same pattern. For example, the vertices 536*a*, 536*b* correspond to related failure issues, and are therefore represented with the same pattern (white). Similarly, the vertices 536*e*, 536*f* correspond to related failure issues, and are therefore represented with the same pattern (a dotted pattern). In an alternative embodiment, the graph 500 could be presented in color, and the vertices within the graph 500 that correspond to related failure issues could be represented with the same color.

The graph 500 shown in FIG. 5 can provide information about different phases of the buildout of a cloud computing system. In some embodiments, the graph 500 can provide information about the pre-production phase 102. In such embodiments, the vertices in the graph 500 can represent failure issues experienced by nodes during the pre-production phase 102 (but not the production phase 104). Alternatively, in some embodiments, the graph 500 can provide information about both the pre-production phase 102 and the production phase 104. In such embodiments, the vertices in the graph 500 can represent failure issues experienced by nodes during both the pre-production phase 102 and the production phase 104.

FIG. 6 illustrates an example of a method 600 that can be performed in order to produce a visual representation of information about failure issues experienced by nodes and to use the visual representation to improve the reliability of nodes that are deployed in a cloud computing system. The method 600 can include identifying 602 failure issues experienced by nodes in a cloud computing system. As indicated above, the failure issues can correspond to the pre-production phase 102, the production phase 104, or both the pre-production phase 102 and the production phase 104.

The method 600 can also include generating 604 a graph 500 that includes information about the failure issues. The failure issues can be represented 606 as vertices within the graph 500, such as the vertices 536*a*-*d* in the graph 500 shown in FIG. 5. Transitions between different failure issues can be represented 608 as edges within the graph 500. The edges can include one or more directed edges (e.g., the directed edge 538*a* in the graph 500 shown in FIG. 5), bi-directional edges (e.g., the bi-directional edge 540*a* in the graph 500 shown in FIG. 5), and/or self-edges (e.g., the self-edges 542*a*-*d* in the graph 500 shown in FIG. 5).

The method 600 can also include modifying 610 a process for servicing the nodes based at least in part on information that is contained within the graph 500. For example, as indicated above, the presence of self-edges (e.g., the self-edges 542*a*-*d*) within the graph 500 can indicate that certain problems are not being repaired correctly, especially if the self-edges are relatively thick (e.g., the self-edge 542d). In this case, the method 600 can include modifying a process for diagnosing or servicing the failure issues 210 that correspond to the vertices in the graph 500 that include self-edges. As another example, the presence of bi-directional edges (e.g., the bi-directional edge 540a) can indicate a hardware fault churn where the failure issue oscillates between two fault codes. In this case, the method 600 can include modifying a process for diagnosing or servicing the failure issues 210 that correspond to the vertices in the graph 500 that include bi-directional edges.

Figure 7:
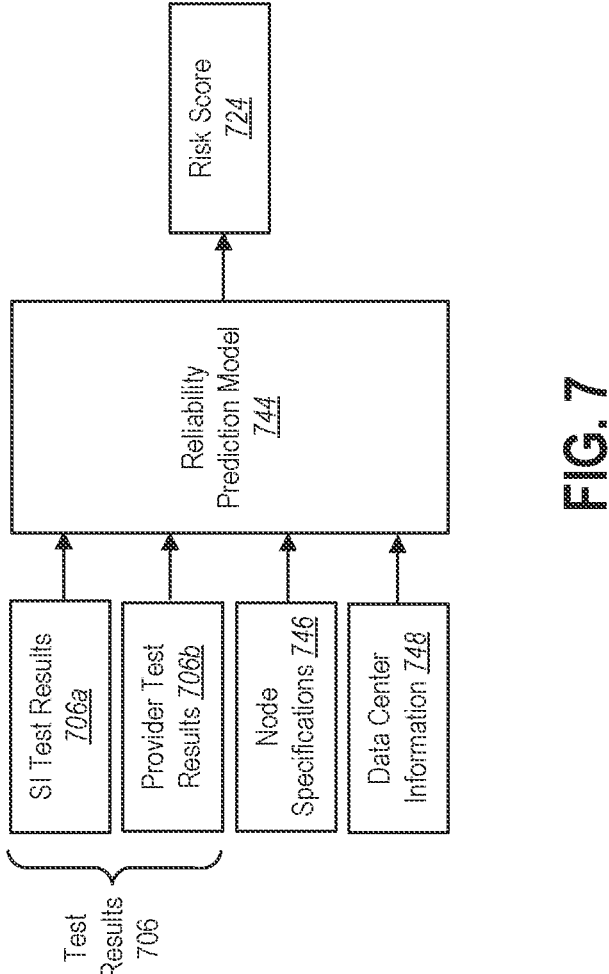
FIG. 7 illustrates an example of a machine learning model that can be used to predict the reliability of a node before the node enters the production phase.

Another aspect of the present disclosure is related to a machine learning model that can be used to predict the reliability of a node before that node enters the production phase 104. This type of machine learning model may be referred to herein as a reliability prediction model. FIG. 7 illustrates an example of a reliability prediction model 744 in accordance with the present disclosure. The reliability prediction model 744 can be configured to output a risk score 724 that indicates the predicted reliability of the node in the production phase 104.

To predict the reliability of a particular pre-production node 220, test results 706 (including test results 706a from tests that a system integrator performs on the production nodes and test results 706b from tests that a cloud computing provider performs on the production nodes) can be provided as inputs to the reliability prediction model 744. Other information related to the pre-production node 220 can also be provided as inputs to the reliability prediction model 744, including node specifications 746 and data center information 748. The node specifications 746 can include node-specific metadata describing specific characteristics of the pre-production node 220 (e.g., manufacturer, hardware generation, stock keeping unit (SKU), product family, type of processor, type and amount of memory). The region and data center information 748 can include information about the geographic region and/or the data center where the node is going to be deployed.

The reliability prediction model 744 can be trained using information about nodes that have been in the production phase 104 for some minimum period of time. Even after the reliability prediction model 744 has been sufficiently trained so that the reliability prediction model 744 can make predictions about nodes that are still in the pre-production phase 102, the reliability prediction model 744 can continue to be fine tuned using additional information that becomes available about nodes in the production phase 104. For example, in some embodiments the reliability prediction model 744 can initially be created based at least in part on data collected from a set of production nodes. The reliability prediction model 744 can then be updated based at least in part on additional data that is collected from that set of production nodes as well as other nodes that are deployed after the reliability prediction model 744 is initially created.

Figure 8:
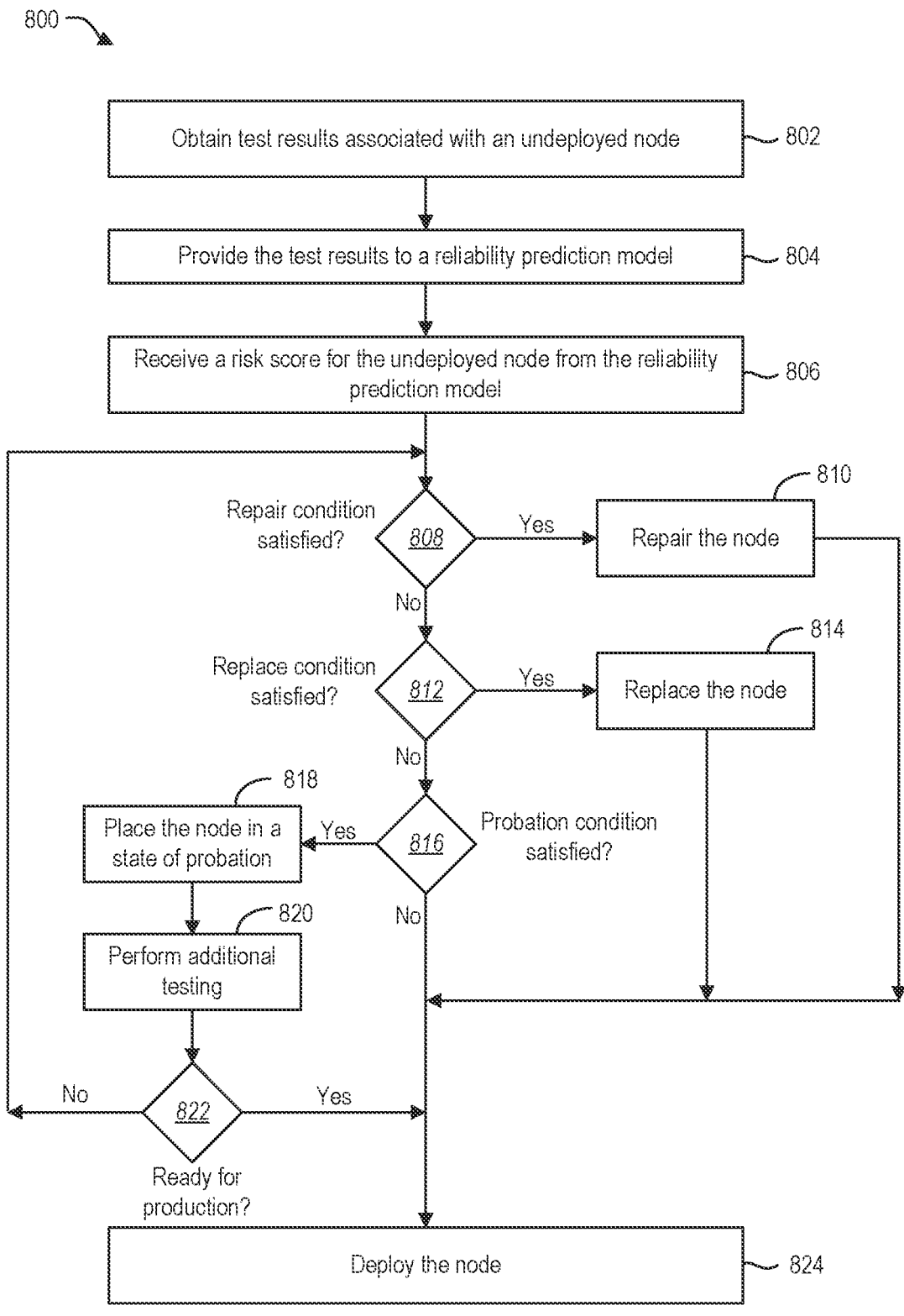
FIG. 8 illustrates an example of a method that utilizes a reliability prediction model to improve the reliability of nodes that are deployed in a cloud computing system.

FIG. 8 illustrates another example of a method 800 that can be performed in order to improve the reliability of nodes that are deployed in a cloud computing system. The method 800 shown in FIG. 8 involves the use of a reliability prediction model 744.

The method 800 can include obtaining 802 test results 706 corresponding to a pre-production node 220. The test results 706 can include test results 706a from tests that a system integrator has performed on the pre-production node 220 and/or test results 706b from tests that a cloud computing provider has performed on the pre-production node 220. The method 800 can also include providing 804 the test results 706 to a reliability prediction model 744. As indicated above, the reliability prediction model 744 can be configured to generate a risk score 724 that indicates the predicted reliability of the pre-production node 220 during the production phase 104. The reliability prediction model 744 can generate the risk score 724 based at least in part on the test results 706 that are provided as input to the reliability prediction model 744. The reliability prediction model 744 can also generate the risk score 724 based at least in part on other information, such as node specifications 746 and data center information 748. Once the risk score 724 has been generated, the method 800 can include receiving 806 the risk score 724 from the reliability prediction model 744.

The method 800 can include determining, based at least in part on the risk score 724, whether a condition 226 has been satisfied for performing corrective action with respect to the pre-production node 220 before the pre-production node 220 enters the production phase 104. For example, the method 800 can include determining 808 whether a repair condition 226a has been satisfied. As indicated above, the repair condition 226a can indicate when a pre-production node 220 should be repaired before entering the production phase 104. If it is determined 808 that a repair condition 226a has been satisfied, then the method 800 can include repairing 810 the pre-production node 220. Once the pre-production node 220 has been repaired 810, then the method 800 can proceed to deploying 824 the pre-production node 220.

If it is determined 808 that the repair condition 226a has not been satisfied, the method 300 can include determining 812 whether a replace condition 226b has been satisfied. As indicated above, the replace condition 226b can indicate when a pre-production node 220 should be replaced (or a component within the pre-production node 220 should be replaced) before entering the production phase 104. If it is determined 812 that a replace condition 226b has been satisfied, then the method 800 can include replacing 814 the pre-production node 220 (or replacing a component within the pre-production node 220). Once the pre-production node 220 (or a component within the pre-production node 220) has been replaced 814, then the method 800 can proceed to deploying 824 the pre-production node 220.

If it is determined 808 that the replace condition 226b has not been satisfied, the method 300 can include determining 816 whether a probation condition 226c has been satisfied. If it is determined 816 that a probation condition 226c has been satisfied, then the method 800 can include placing 818 the pre-production node 220 in a state of probation. While in the state of probation, additional testing can be performed 820. The additional testing can include stress testing and burn-in testing. If as a result of the additional testing it is determined 822 that the pre-production node 220 is ready for the production phase 104, then the method 800 can proceed to deploying 824 the pre-production node 220. Otherwise, the method 800 can include re-evaluating the repair condition 226a and/or the replace condition 226b based on the results of the testing that is performed while the pre-production node 220 is in a state of probation. In some embodiments, a cloud computing provider may choose to allocate nodes that have been placed in a state of probation to lower priority customers.

If no condition has been satisfied for performing corrective action before the pre-production node 220 enters the production phase 104, then the method 800 can proceed to deploying 824 the pre-production node 220 without performing any corrective action.

Figure 9:
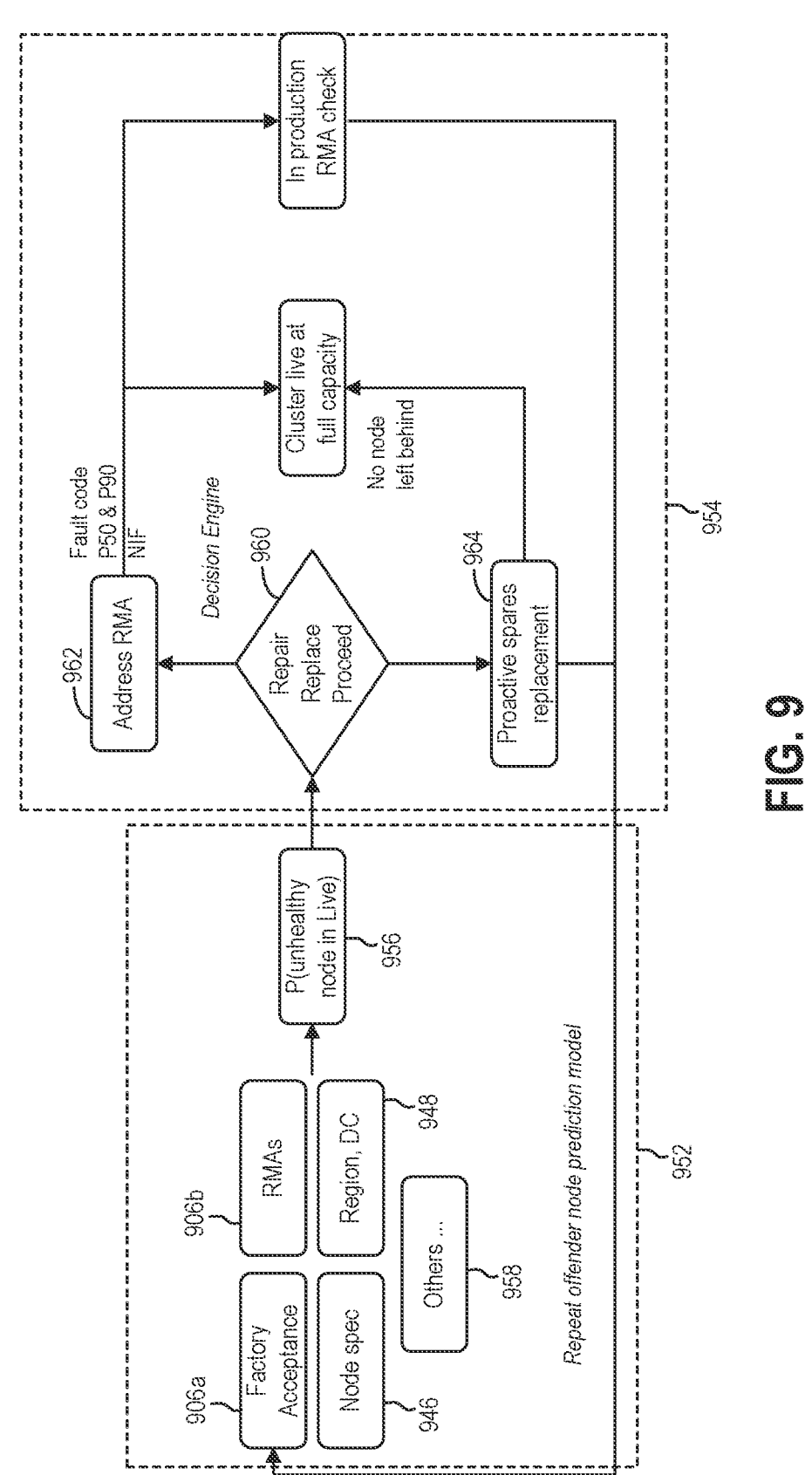
FIG. 9 illustrates an example of a system that utilizes a machine learning model to predict the reliability of a node before that node enters the production phase.

FIG. 9 illustrates an example of a system 900 that utilizes a machine learning model to predict the reliability of a node before that node enters the production phase 104. The system 900 shown in FIG. 9 includes a repeat offender node prediction model 952, which is tightly coupled with a decision engine 954.

The prediction model 952 is configured to predict the likelihood that a node will incur a high out of service rate arising from initial failure issues (e.g., hardware failure issues such as memory, CPU, disks, motherboard, NICs, etc.) encountered in the initial node lifecycle (e.g., in the pre-production phase 102). The output of the prediction model 952 can be used to prioritize repair or replacement actions by providing a risk score. In some embodiments, the risk score can be considered to be a repeat offender risk score. In other words, the risk score for a particular node can indicate the likelihood that the node will repeatedly go out of service while in production (i.e., during the production phase 104). This can be viewed as implementing a "lemon law."

The prediction model 952 shown in FIG. 9 is shown with a module 956 that is configured to calculate a risk score for a node based on various information, including factory acceptance datasets 906a and return merchandise authorization (RMA) datasets 906b corresponding to the configuration and validation phase 102b. The factory acceptance datasets 906a are examples of the SI test results 206a described previously. The factory acceptance datasets 906a can be taken from logs that are created during the factory phase 102a. The RMA datasets 906b are examples of the provider test results 206b described previously. The RMA datasets 906b can be obtained during RMA testing that occurs during the configuration and validation phase 102b. In some embodiments, the RMA datasets 906b can include an RMA count by fault code and/or an RMA duration by fault code. The RMA count by fault code can correspond to the frequency of occurrence metric 218 discussed previously. The RMA duration by fault code can correspond to the mean time to repair metric 216 discussed previously. The RMA datasets 906b can be taken from logs that are created during the configuration and validation phase 102b. The risk score can also be calculated based at least in part on node specifications 946, region and data center information 948, and other information 958. Production metrics (e.g., OOS metrics 212, average OOS metrics 214) can also be taken into consideration when calculating risk scores. In some embodiments, an annual interruption rate (AIR) metric can be taken into consideration when calculating risk scores. An AIR metric can indicate how frequently a customer's virtual machines (VMs) were interrupted (e.g., rebooted) during a particular period of time.

The output of the prediction model 952 can be integrated into the decision engine 954 to determine the best course of action for a predicted unhealthy node. In some embodiments, a determination 960 can be made about whether the predicted unhealthy node can be successfully repaired 962 within the estimated live date for the cluster to which the node belongs. If not, this can indicate that the node should be replaced 964 rather than repaired.

In some embodiments, the decision engine 954 can prioritize repairs based on the risk score that is provided by the prediction model 952. Priorities can also be determined based at least in part on the specific types of failure issues 210 that are being experienced, the extent to which similar failure issues 210 have resulted in a determination of "no issue found" (NIF) in the past, and the mean time to repair metric 218 associated with the failure issue 210. The decision engine 954 can determine how to make the buildout of a cluster of nodes go faster by reducing unnecessary time spent in NIFs and prioritizing repairs that will work before estimated live date of the cluster. In some embodiments, there can be a separate workstream to identify spares and to stock a supply of specific nodes that experience buildout issues or failure classifications and impact COGS.

In some embodiments, the data provided by the prediction model 952 and/or the decision engine 954 can provide guidance to system integrators and cloud computing providers as to how they can work together more effectively. For example, the output of the spares data can provide guidance to system integrators to determine additional burn in tests and set up a closed loop system in place. In addition, technician performance can be compared to factory SI specific repair performances and drive parity.

In some embodiments, the data provided by the prediction model 952 can be used for determining scheduler rules for virtual machine (VM) allocation to minimize risk and impact to users. Thus, reducing VM downtime can be an additional benefit of the techniques disclosed herein.

The techniques disclosed herein make it possible to improve the reliability of nodes utilized by a cloud computing provider by determining key hardware issues early in the lifecycle that have an impact on reliability, cloud capacity, and user experience in a production environment. Hardware failure data from the factory to live pipeline and the early days in production can be leveraged to predict the reliability and performance of nodes in production. Having this information is important because node failures impact available capacity, user experience, and COGS for the cloud provider.

As described herein, the present disclosure facilitates an automated platform to analyze hardware failures and isolation from software, firmware, and cabling issues applied to the early lifecycle of the hardware as it enters capacity buildout and during the early days once it enters production and is subjected to user workloads. The results can be made available to engineering teams and technicians in the field who can shape policy on failures to determine the best course of action (e.g., repair a component or replace a part or use a different model or change design) to minimize delays to cluster buildout. A prediction model as disclosed herein can be used to address quality in the early node lifecycle that is shown to impact production, thereby improving buildout cycle time, COGS, and fleet health, as well as reducing impact to users.

Another aspect of the present disclosure is a visual representation that surfaces transition patterns associated with common failure issues (which can be represented as hardware fault codes). An example of this type of visual representation was described above in connection with the graph 500 shown in FIG. 5. This type of visual representation allows engineering teams and field technicians to judge the effectiveness of error diagnostics (e.g., few transitions between fault codes indicates effective diagnostics) and effectiveness of repairs performed (e.g., few transitions overall indicates effective repair). Further, as new diagnostics for hardware failures are added, it is possible to quickly see if this is able to add a distinct classification across the failures or if it co-occurs with other specific failures and therefore is redundant.

Another aspect of the present disclosure is the ability to determine if improvements to diagnostic tools and/or training of technicians would be helpful to reduce churn in fixing failure issues (e.g., hardware failures). A comparison can be made between the mean time to repair a given hardware failure at the factory versus at a particular data center. This can indicate the effectiveness of the in-house diagnostic tools in use versus the ones that are used by system integrators, which can provide valuable information about the skillfulness of in-house technicians at data centers compared to technicians at the factory (manufacturing and integration facilities).

As described herein, a prediction model can be built using hardware failure data from early node lifecycle that predicts the probability of encountering future issues (e.g., going out of service) in a production environment past a given threshold (e.g., 30 days) where the hardware is subject to user workloads. By predicting which nodes will have a high impact to reliability, capacity, and user experience in production, it is possible to identify a risk score for pre-production nodes. Pre-production nodes with a relatively high risk score can be replaced with spares, replaced with a different model, or returned to the system integrator for a root cause analysis and potential design change. It is possible to use the prediction model disclosed herein to influence additional stress diagnostics at the system integrator for high frequency fault codes and conduct stress/burn tests prior to reentry to production. This allows a cloud computing provider to move proactively, rather than reactively, to hardware failures on a node that has gone live and is hosting VMs, thereby maximizing hardware utilization and minimizing COGS.

As discussed above, the performance of the prediction model disclosed herein can be based on the effectiveness of software catching the hardware failures at the factory and at the data center during buildout early in the lifecycle. Additional data on hardware failures can be obtained as nodes are exposed to customer workloads in production. This additional data should be fed back to the software that is used at the factory and the data center to identify hardware failures, so that the software can incorporate such failures and check for such failures in the future as part of the hardware validation process. The results can be used to tune the prediction model and make ongoing gains in prediction results.

Figure 10:
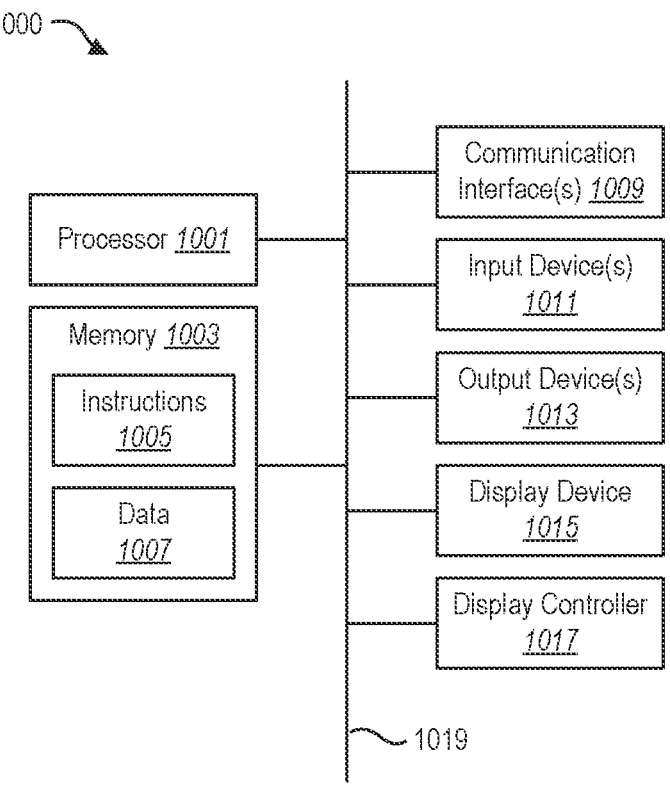
FIG. 10 illustrates certain components that can be included within a computing device.

One or more computing devices 1000 can be used to implement at least some aspects of the techniques disclosed herein. FIG. 10 illustrates certain components that can be included within a computing device 1000.

The computing device 1000 includes a processor 1001 and memory 1003 in electronic communication with the processor 1001. Instructions 1005 and data 1007 can be stored in the memory 1003. The instructions 1005 can be executable by the processor 1001 to implement some or all of the methods, steps, operations, actions, or other functionality that is disclosed herein. Executing the instructions 1005 can involve the use of the data 1007 that is stored in the memory 1003. Unless otherwise specified, any of the various examples of modules and components described herein can be implemented, partially or wholly, as instructions 1005 stored in memory 1003 and executed by the processor 1001. Any of the various examples of data described herein can be among the data 1007 that is stored in memory 1003 and used during execution of the instructions 1005 by the processor 1001.

Although just a single processor 1001 is shown in the computing device 1000 of FIG. 10, in an alternative configuration, a combination of processors (e.g., an ARM and DSP) could be used.

The computing device 1000 can also include one or more communication interfaces 1009 for communicating with other electronic devices. The communication interface(s) 1009 can be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computing device 1000 can also include one or more input devices 1011 and one or more output devices 1013. Some examples of input devices 1011 include a keyboard, mouse, microphone, remote control device, button, joystick, trackball, touchpad, and lightpen. One specific type of output device 1013 that is typically included in a computing device 1000 is a display device 1015. Display devices 1015 used with embodiments disclosed herein can utilize any suitable image projection technology, such as liquid crystal display (LCD), light-emitting diode (LED), gas plasma, electroluminescence, or the like. A display controller 1017 can also be provided, for converting data 1007 stored in the memory 1003 into text, graphics, and/or moving images (as appropriate) shown on the display device 1015. The computing device 1000 can also include other types of output devices 1013, such as a speaker, a printer, etc.

The various components of the computing device 1000 can be coupled together by one or more buses, which can include a power bus, a control signal bus, a status signal bus, a data bus, etc. For the sake of clarity, the various buses are illustrated in FIG. 10 as a bus system 1019.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
identifying a plurality of failure issues experienced by nodes in a cloud computing system;
generating a graph that comprises information about the plurality of failure issues;
representing the plurality of failure issues as vertices within the graph;
representing transitions between different failure issues as edges within the graph;
identifying an edge with a thickness of the edge indicating a failure issue is repeatedly occurring in a plurality of nodes;
modifying an error diagnostic process based at least in part on the thickness of the edge indicating that the failure issue is occurring in the plurality of nodes;
modifying a process for servicing the plurality of nodes with a different repair based at least in part on the information within the graph indicating that the failure issue is occurring in the plurality of nodes, thereby producing a modified process; and
performing corrective action with respect to at least one pre-production node based at least in part on the modified process.

2. The method of claim 1, wherein:
the graph comprises a self-edge corresponding to a failure issue that has occurred repeatedly in at least some of the plurality of nodes; and
modifying the process comprises modifying how the failure issue is diagnosed or repaired.

3. The method of claim 1, wherein a thickness of an edge within the graph is proportional to a frequency of occurrence of a transition between two different failure issues.

4. The method of claim 1, wherein:
the graph comprises an edge corresponding to a transition between two different failure issues that has occurred in at least some of the plurality of nodes; and
modifying the process comprises modifying how at least one of the two different failure issues is diagnosed or repaired.

5. The method of claim 1, wherein:
the graph comprises a bi-directional-edge indicating that two different failure issues have occurred in succession in at least some of the plurality of nodes; and
modifying the process comprises modifying how at least one of the two different failure issues is diagnosed or repaired.

6. The method of claim 1, wherein the plurality of failure issues occur during a pre-production phase.

7. The method of claim 1, wherein the plurality of failure issues occur during a production phase.

8. A device, comprising:
a memory to store data and instructions; and
a processor in communication with the memory, wherein the processor is operable to:
identify a plurality of failure issues experienced by nodes in a cloud computing system;
generate a graph that comprises information about the plurality of failure issues;
represent the plurality of failure issues as vertices within the graph;
represent transitions between different failure issues as edges within the graph;
identify an edge with a thickness of the edge indicating a failure issue is repeatedly occurring in a plurality of nodes;
modify an error diagnostic process based at least in part on the thickness of the edge indicating that the failure issue is occurring in the plurality of nodes;
modify a process for servicing the plurality of nodes with a different repair based at least in part on the information within the graph indicating that the failure issues is occurring in the plurality of nodes, thereby producing a modified process; and
perform corrective action with respect to at least one pre-production node based at least in part on the modified process.

9. The device of claim 8, wherein the graph comprises a self-edge corresponding to a failure issue that has occurred repeatedly in at least some of the plurality of nodes; and
the processor is further operable to modify the process for servicing the plurality of nodes by modifying how the failure issue is diagnosed or repaired.

10. The device of claim 8, wherein a thickness of an edge within the graph is proportional to a frequency of occurrence of a transition between two different failure issues.

11. The device of claim 8, wherein the graph comprises an edge corresponding to a transition between two different failure issues that has occurred in at least some of the plurality of nodes; and
the processor is further operable to modify the process for servicing the plurality of nodes by modifying how at least one of the two different failure issues is diagnosed or repaired.

12. The device of claim 8, wherein:
the graph comprises a bi-directional-edge indicating that two different failure issues have occurred in succession in at least some of the plurality of nodes; and the processor is further operable to modify the process for servicing the plurality of nodes by modifying how at least one of the two different failure issues is diagnosed or repaired.

13. The device of claim 8, wherein the plurality of failure issues occur during a pre-production phase.

* * * * *